United States Patent

[11] 3,617,657

[72] Inventor Sherman T. Brewer
Little Silver, N.J.

[21] Appl. No. 852,813
[22] Filed Aug. 25, 1969
[45] Patented Nov. 2, 1971

[73] Assignee Bell Telephone Laboratories, Incorporated
Murray Hill, N.J.

[54] REPEATER MONITORING SYSTEM
5 Claims, 2 Drawing Figs.

[52] U.S. Cl. .......... 179/175.31R
[51] Int. Cl. .......... H04b 3/46
[50] Field of Search .......... 179/175.31; 331/181, 36

[56] References Cited

UNITED STATES PATENTS

| | | | |
|---|---|---|---|
| 2,784,264 | 3/1957 | Hansen et al. | 179/175.31 |
| 3,059,068 | 10/1962 | Frankton et al. | 179/175.31 |
| 3,092,787 | 6/1963 | Pohlman et al. | 331/181 |
| 3,127,577 | 3/1964 | La Pointe | 331/36 |
| 3,414,826 | 12/1968 | Vandegraaf | 331/181 |
| 3,557,323 | 1/1971 | Chalhoub | 179/175.31 R |

*Primary Examiner*—Kathleen H. Claffy
*Assistant Examiner*—Douglas W. Olms
*Attorneys*—R. J. Guenther and E. W. Adams, Jr.

ABSTRACT: A repeater monitoring system wherein the individual signature frequency of the crystal oscillator associated with each repeater is varied over a small range determined by the control signal fed to the varactor in the crystal oscillator feedback loop. The control signal is in turn determined by the level of the signal at the monitoring frequency at the output of the repeater amplifier. This monitoring system has the capabilities of detecting failures in both transmission bands, sensing transmission levels, measuring intermodulation distortion, and detecting nonlinear and noisy repeaters.

INVENTOR
S. T. BREWER
BY John P. McDonnell
ATTORNEY

REPEATER MONITORING SYSTEM

BACKGROUND OF THE INVENTION

This invention relates to monitoring systems and, more particularly, to repeater monitoring in a telephone system.

The prior art abounds in transmission line repeater monitoring schemes. These monitoring systems usually have networks associated with each repeater which respond to an individual monitoring frequency that identifies the particular repeater. For example, the prior art networks often employ filters which pickoff the singular monitoring frequency associated with the repeater being monitored out of one transmission band, multiply it, and then retransmit it to the originating terminal in the other transmission band. Other prior art monitoring networks employ crystals and resonant circuitry having distinct resonant frequencies differing from the other repeater networks connected with the repeater amplifier or its feedback loop to alter the response of the repeater in response to a monitoring tone at the particular repeater resonant frequency and thereby indicate the operational status of the repeater.

Invariably, however, each of the prior art monitoring schemes is limited to detecting total failure of a repeater and sensing transmission levels. The technician at the attended stations of the transmission system thus has little in the way of diagnostic information as to the exact nature of the malfunction on the repeaters and, in some cases, the particular repeater causing the difficulty. The technician could not determine, for example, the exact location of the repeater introducing the noise, the degree of intermodulation, distortion or nonlinearity introduced by a particular repeater, or whether the repeater malfunction was due to the amplifier or the high or low pass filters. Without some determination of the exact nature of the trouble in the repeater, corrective measures (such as adjusting the DC bias supplied to the repeaters) cannot be undertaken at the attended station and it is often necessary to physically locate a particular or series of repeaters in the field to determine and correct the malfunction. In the case of most systems, and submarine cable systems in particular, the cost of this trouble locating and repairing process is considerable.

It is, therefore, an object of this invention to provide a repeater monitoring system having the capabilities of detecting the exact nature of a repeater malfunction in a transmission system.

SUMMARY OF THE INVENTION

The present invention is directed to a repeater monitoring network which includes a crystal oscillator and is connected with each repeater or group of repeaters in a transmission system. Each crystal oscillator has a varactor connected in its regenerative feedback loop and an individual "signature" output frequency which identifies the repeater or group of repeaters with which the oscillator is associated. Changes in the reactance of the varactor shift the signature output frequency of the oscillator by a small amount hereinafter referred to as $\Delta f$. The reactance of the varactor is in turn controlled by the magnitude of a control signal which is proportional to the magnitude of the signal at the monitoring frequency picked-off at the output of the repeater amplifier. The magnitude of the $\Delta f$ shift in the output frequency of the monitoring network will thus indicate the noise or the distortion, for example, that is introduced by a particular repeater or group of repeaters. The monitoring signal, which is transmitted from a terminal station, may comprise either a single frequency or a combination of two or more frequencies to both monitor the intermodulation distortion introduced by a repeater or group of repeaters and determine whether a repeater malfunction is due to a failure of an amplifier or a high pass or low pass filter. Since thermal noise has a broad frequency spectrum with components at whatever frequency is chosen for the monitoring signal, the monitoring network continuously monitors the effects of thermal noise. If desired, a linear-to-log converter may be inserted between the varactor and the network which detects the magnitude of the signal at the monitoring frequency at the repeater amplifier output to extend the dynamic range of the monitoring network.

BRIEF DESCRIPTION OF THE DRAWINGS

Other objects and features of the present invention will readily be apparent from the following discussion and drawings in which.

DETAILED DESCRIPTION

Figure 1:
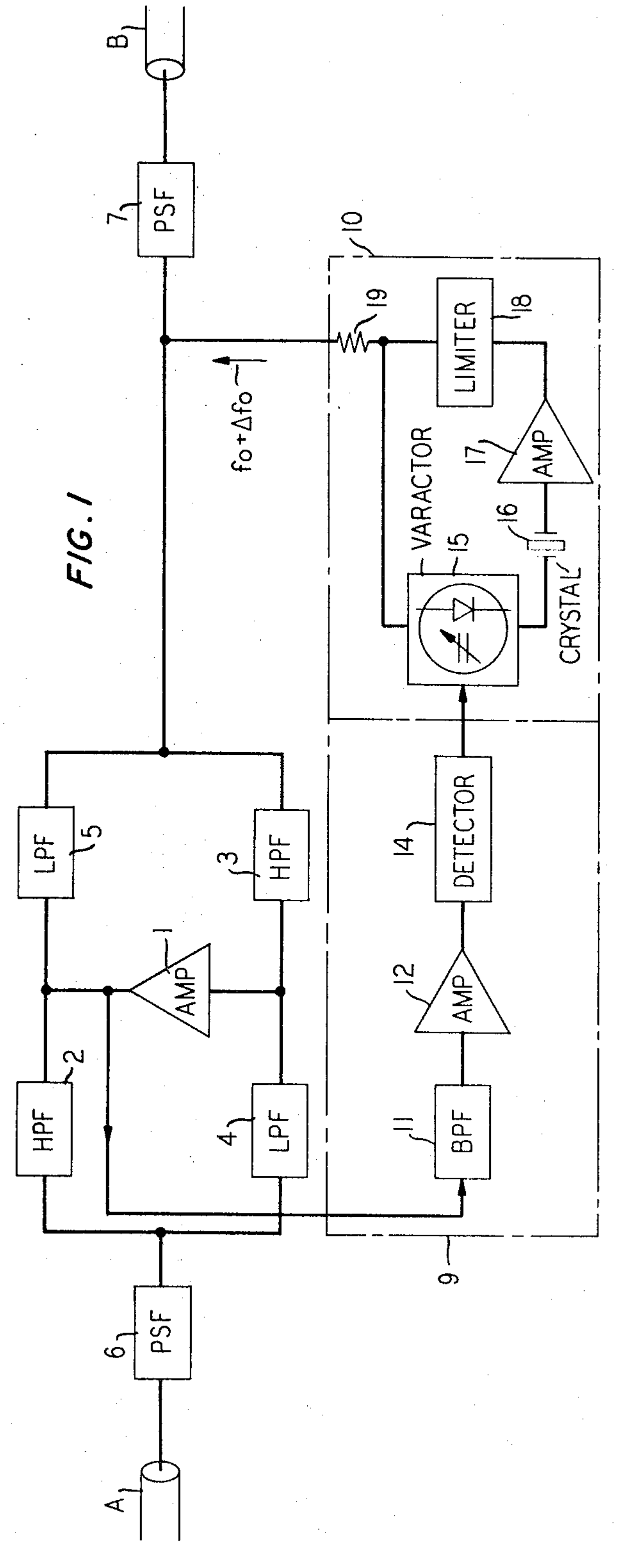
FIG. 1 is a block diagram embodiment of the present invention.

As can be seen from the embodiment of the invention illustrated in FIG. 1 of the drawing, a four-wire repeater comprising amplifier 1, high pass filters 2 and 3, and low pass filters 4 and 5 are connected in conventional four-wire repeater fashion with power separation filters 6 and 7 between points A and B of a repeatered transmission system. In this embodiment, power separation filter 6 is connected between point A and high pass filter 2 and low pass filter 4, while power supply filter 7 is connected between point B and high pass filter 3 and low pass filter 5. Amplifier 1 is connected from the junction of high pass filter 3 and low pass filter 4 to the junction of high pass filter 2 and low pass filter 5. The monitoring network comprises a detector and modulating circuit 9 and a crystal oscillator 10 which includes a varactor in its regenerative feedback loop. The detector and modulating circuit 9 includes a band-pass filter 11 which has its input connected to the output of the repeater amplifier 1. As will be apparent from the following discussion, band-pass filter 11 will be preferably designed to pass a limited band which may lie at the extremes or in between the high and low transmission bands. For example, if the low transmission band were to be 1 through 11 mHz. and the high band 14 through 24 mHz., then the band-pass filter could be designed to pass a limited band of 1 mHz. centered about 12.5 mHz. The input to the monitoring network would accordingly be restricted to this limited band. In this example, the 12.5 mHz. monitoring frequency would be obtained with a single harmonic frequency or a sum or difference combination of frequencies transmitted in either the low pass or high pass transmission bands.

The output of band-pass filter 11 is connected to the input of amplifier 12 whose output is in turn connected to the input of detector 14 which rectifies the output of amplifier 12. The control signal output of detector 14 of the detecting and modulating network 9 is connected to varactor 15 of the crystal oscillator 10. The varactor 15 is shown symbolically in FIG. 1 as a diode-variable capacitor. It should be realized, of course, that any equivalent device or network that exhibits a variable reactance in response to a DC input signal could be used in place of the varactor 15. A detailed discussion of varactors and the characteristics thereof may be found in the text Varactor Applications, M.I.T. Press by P. Penfield, Jr. and R. P. Rafuse, Copyright 1962. For present purposes it appears sufficient to note that the varactor 15 will vary its reactance in accordance with the DC signal output of detector 14. A crystal 16, amplifier 17, and limiter 18 are connected in a series loop with varactor 15 as the crystal oscillator 10. The output of the crystal oscillator 10 appears at limiter 18 and is transmitted via isolation resistor 19 to the power separation filter 7, to be transmitted to point B in the transmission system. Isolation resistor 19 prevents a complete system breakdown in the event of a failure such as a short circuit in the repeater monitoring circuit, i.e., the resistance of resistor 19 is sufficiently large to prevent a short circuit in the monitoring network from draining the power from the rest of the system. Limiter 18 regulates the level of the output signal of the crystal oscillator 10 and may be any one of a large number of well-known circuits. For applications such as submarine cable systems, temperature compensation would preferably be added to the limiter circuit 18.

In the present monitoring system, if information on the repeater parameters other than thermal noise were desired, a monitoring signal would be simultaneously transmitted through each repeater in the system from a terminal station. (As noted heretofore, since thermal noise has a broad frequency spectrum with components at whatever frequency is chosen for the monitoring frequency, the monitoring network continually monitors thermal noise.) In the repeater illustrated in FIG. 1, this monitoring signal would be passed by band-pass filter 11 and amplified by amplifier 12. The amplified signal output of amplifier 12 is then rectified by detector 14 and fed to the varactor 15 of crystal oscillator 10. The DC signal to the varactor 15 is thus proportional to the magnitude of the thermal noise plus the magnitude of the frequency component or components that comprise the transmitted monitoring signal at the output of amplifier 1 and directly controls the reactance of varactor 15 in accordance with the level of this composite signal at the output of the repeater amplifier. Varying the reactance of the varactor 15 causes the output frequency of oscillator 10 to shift by an amount proportional to the change of reactance of the varactor 15 which is, in turn, controlled by the DC signal from the detector 14. For example, if the repeater illustrated in FIG. 1 were the *n*th repeater in the transmission system, then its crystal oscillator would transmit a nominal frequency of $f_n$ and a change in the reactance of the varactor 15 in response to level of the composite monitoring signal at the output of the repeater amplifier would modify the output frequency $f_n$ by a small amount $\Delta f_n$ to produce an output frequency of $f_n+\Delta f_n$. Since the level of the monitoring signal at the output of the repeater amplifier determines the magnitude of the $\Delta f_n$ shift, measurement of this quantity provides detailed information concerning the operational capabilities of the *n*th repeater. As noted heretofore, the oscillator at each repeater has an individual signature frequency, hence the $\Delta f$ shift in each repeater can be readily identified at the terminal station and measured to provide detailed information as to the operational capabilities of each repeater or group of repeaters. Thus, for example, a noisy repeater would increase the level of the signal at the monitoring frequency at the output of the repeater amplifier 1 which would in turn result in a $\Delta f$ shift in the output frequency of the crystal oscillator that indicates the magnitude of the noise being introduced by that particular repeater. With this information, the technician at a terminal in the transmission system can decide on the necessity of corrective action such as reducing the amplifier DC bias by adjustment at the terminal station or, in severe cases, by replacing or repairing the malfunctioning repeater. Heretofore, it was often difficult to pinpoint the cause of a repeater malfunction and hence impossible to determine whether or not corrective action could be taken at an attended station or terminal. This is especially significant in submarine cable systems where the cost of raising the cable to determine the cause of a malfunction is considerable.

In addition to the signal at the monitoring frequency at the output of the repeater amplifier continuously providing an indication of the noise generated in the repeater, the present invention also provides a method for determining the distortion attributable to amplifier nonlinearity and intermodulation products, e.g., distortion due to the harmonic frequencies and addition of frequencies. In accordance with the present invention, monitoring frequencies are chosen such that their harmonics or sum frequencies lie in the limited band passed by the band-pass filter 11 of the detecting and modulating network 9. Alternatively, the monitoring signal could be derived by combining frequencies to obtain a X–Y or 2X–Y resultant signal in the passband of the band-pass filter 11 of the monitoring network. The resultant frequency would then be monitored in the manner described heretofore to provide an indication of the second and third order product distortion introduced by a particular repeater or group of repeaters. This flexibility in determining the frequency components that comprise the transmitted monitoring signal also permits the attended terminal to determine whether a repeater malfunction is due to a malfunction in either a high pass filter or a low pass filter. As noted, the repeater monitoring schemes of the prior art were restricted to determining whether or not the repeater amplifier was functioning and were not capable of providing the degrees of flexibility of the present monitoring system. In addition to detecting failures in transmission bands and sensing transmission levels in the system as in the prior art monitoring systems, the present invention thus provides the capabilities of measuring intermodulation distortion, detecting noisy and nonlinear repeaters, and determining whether the high pass filters and low pass filters are performing properly.

Figure 2:
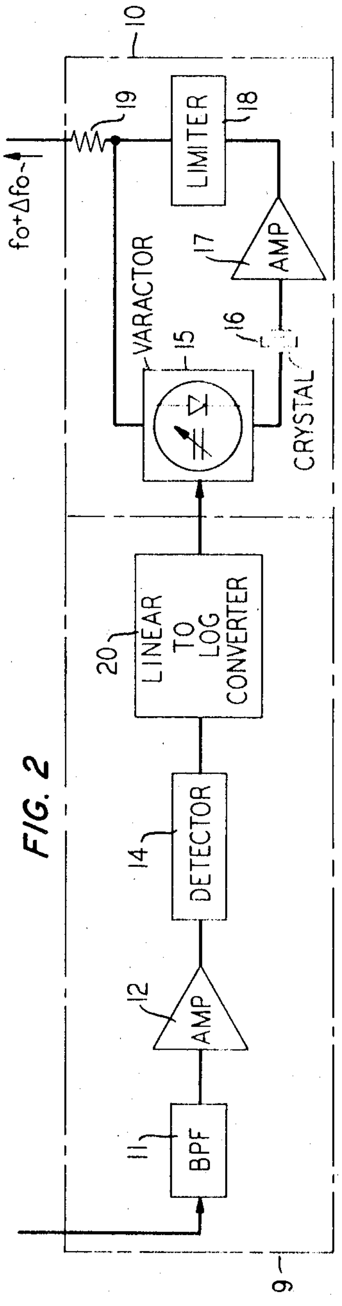
FIG. 2 illustrates a second block diagram embodiment of the monitoring network of the present invention with extended dynamic range.

A second embodiment of the invention is shown in FIG. 2 wherein a linear-to-log converter 20 is connected between detector 14 and the varactor 15 to increase the dynamic range of the monitoring circuit. Except for the inclusion of the converter 20, the monitoring circuit of the dotted box of FIG. 2 is identical to the monitoring circuit of the dotted box of FIG. 1 and could be directly inserted in place of the monitoring network of FIG. 1. The converter 20 may be any one of a large number of such circuits such as, for example, a large resistor and diode connected in series to receive the signal from the detector 14 with the output signal, which may subsequently be amplified, taken across the diode. Without the linear-to-log converter 20, the extremes of the dynamic range over which the monitor can operate are limited by the cutoff and saturation points of the amplifier 17. The linear-to-log converter permits the signal delivered to the oscillator 10 to be expressed over a linear range in db. due to the well-known characteristics of the db. scale, thereby effectively expanding the dynamic range of the monitoring network. The remaining components of FIG. 2 perform the same function as their identical components in FIG. 1 and hence bear the same numerical designation.

In the discussion to this point only a single repeater and the monitoring network associated therewith have been treated. The overall system would, of course, include a large number of repeaters interconnected in a serial line between the terminal stations. In a preferred embodiment, each repeater would have an individual monitoring network connected therewith with the crystal oscillator of each monitoring network having an individual signature frequency identifying the particular repeater. If desired, it is only necessary to monitor some of the repeaters, e.g., every other repeater rather than each repeater, and still obtain the advantages of the present invention although the resultant information transmitted to the terminal station would indicate the operational capabilities of the repeaters in a given group rather than a single repeater.

In summary, then, the present invention is directed to a repeater monitoring system wherein each repeater in a transmission system has a detecting and modulating network and a crystal oscillator whose regenerative feedback loop includes a varactor or similar variable reactance device. A monitoring signal, which may comprise a combination of signals in the high and low pass bands of the system, is transmitted from one or the other of the terminal stations through the system and is picked-off at the output of the repeater amplifier by the detecting and modulating network to provide a DC control signal proportional to the level of the monitoring signal or signals and the thermal noise introduced by the repeater or repeaters being monitored. (Since thermal noise has a broad frequency spectrum with components at whatever frequency is chosen for the monitoring frequency, the monitoring network continually monitors thermal noise.) The DC control signal is fed to the varactor in the crystal oscillator feedback loop to vary the reactance of the varactor and the output frequency of the crystal oscillator in accordance with the DC control signal. The signature frequency $f_n$ of the crystal oscillator, which is shifted by an amount $\Delta f_n$ by the DC control signal, is then transmitted to the terminal station to indicate the transmission level, the amount of nonlinearity, noise, and/or intermodulation distortion introduced by the repeaters, and a failure in either transmission band and whether this failure is due to an amplifier or filter failure. In the case of a filter failure, determination of whether a low pass or high pass filter is malfunctioning may be made at the terminal station.

What is claimed is:

1. A repeater monitoring system for a transmission system wherein signals to and from transmitting and receiving stations are simultaneously transmitted along a single transmission medium in separate frequency bands, and each of the repeaters in said transmission system comprises a solid state amplifier capable of simultaneously amplifying both of said frequency bands, said monitoring system comprising an individual monitoring network associated with each of the repeaters to be monitored, each of said individual monitoring networks including a crystal oscillator having an individual output frequency which identifies the repeater being monitored, a single input detecting network connected to the output of said repeater amplifier to provide an output signal proportional to the output level at the repeater amplifier of the signal transmitted at the predetermined monitoring frequency, and means connected with said crystal oscillator and said detecting network to change incrementally the output frequency of said crystal oscillator in accordance with the output signal from said detecting network, whereby the incremental change in output frequency of said crystal oscillator indicates the operational capabilities of its associated repeater.

2. A repeater monitoring system in accordance with claim 1 wherein said means connected to said crystal oscillator and said detecting network comprises a varactor.

3. A repeater monitoring system in accordance with claim 2 wherein a linear-to-log converter is connected between said detecting network and said varactor to increase the dynamic range of said repeater monitoring system.

4. A repeater monitoring system for a transmission system wherein signals to and from transmitting and receiving stations are simultaneously transmitted along a single transmission medium in separate frequency bands, and each of the repeaters in said transmission system comprises a solid-state amplifier capable of simultaneously amplifying both frequency bands, said monitoring system comprising an individual monitoring network associated with each of the repeaters to be monitored, each of said individual monitoring networks including a crystal oscillator having an individual output frequency which identifies the repeater being monitored, a single input detecting network comprising a band-pass filter tuned to pass a limited band centered at a predetermined monitoring frequency, the input of said band-pass filter being connected to the output of said repeater amplifier to provide a signal at the output of the band-pass filter which is proportional to the output level at the repeater amplifier of a signal transmitted at the predetermined monitoring frequency, and variable reactance means connected with the output of said band-pass filter and in the regenerative feedback loop of said crystal oscillator to vary the output frequency of said crystal oscillator in accordance with the level of the signal at the predetermined monitoring frequency at the output of said repeater amplifier.

5. A repeater monitoring system in accordance with claim 4 wherein a linear-to-log converter is connected between said band-pass filter and said variable reactance means to increase the dynamic range of said monitoring network.

* * * * *